US012590905B2

(12) United States Patent
Butkevich et al.

(10) Patent No.: US 12,590,905 B2
(45) Date of Patent: Mar. 31, 2026

---

(54) METHOD AND SYSTEM FOR DISCRIMINATING DEFECTS PRESENT ON A FRONTSIDE FROM DEFECTS PRESENT ON A BACKSIDE OF A TRANSPARENT SUBSTRATE

(71) Applicants:Unity Semiconductor, Montbonnot-Saint-Martin (FR); Unity Semiconductor GmbH, Dresden (DE)

(72) Inventors: Alexey Butkevich, Dresden (DE); Jean Boulanger, Saint Ismier (FR)

(73) Assignees: Unity Semiconductor, Montbonnot-Saint-Martin (FR); Unity Semiconductor GmbH, Dresden (FR)

( * ) Notice: Subject to any disclaimer, the term of this patent is extended or adjusted under 35 U.S.C. 154(b) by 55 days.

(21) Appl. No.: 18/722,087

(22) PCT Filed: Nov. 17, 2022

(86) PCT No.: PCT/EP2022/082330
§ 371 (c)(1),
(2) Date: Jun. 20, 2024

(87) PCT Pub. No.: WO2023/117229
PCT Pub. Date: Jun. 29, 2023

(65) Prior Publication Data
US 2025/0052692 A1     Feb. 13, 2025

(30) Foreign Application Priority Data
Dec. 23, 2021     (EP) ..................................... 21315290

(51) Int. Cl.
*G01N 21/958*     (2006.01)
*G01N 21/47*     (2006.01)

(52) U.S. Cl.
CPC ....... *G01N 21/958* (2013.01); *G01N 21/4738* (2013.01); *G01N 2201/10* (2013.01)

(58) Field of Classification Search
CPC ............ G01N 21/958; G01N 21/4738; G01N 2201/10; G01N 21/896; G01N 2021/8967;
(Continued)

(56) References Cited

U.S. PATENT DOCUMENTS

2009/0103079 A1*   4/2009   Uto .................... G01N 21/9501
356/237.4
2013/0210188 A1*   8/2013   Wang .................... H10F 39/014
438/73
(Continued)

FOREIGN PATENT DOCUMENTS

WO     02/39099 A2    5/2002
WO     2017/167573 A1   10/2017

OTHER PUBLICATIONS

De Gevigney, Mayeul Durand, Novel Surface Scanning Inspection System for Opague and Transparent Substrates Using Laser Dopper Velociimetry, 2018 29th Annual Semi Advanced Semiconductor Manufacturing Conference, IDDD, (Apr. 30, 2018), pp. 23-28.
(Continued)

*Primary Examiner* — Seung C Sohn
(74) *Attorney, Agent, or Firm* — TraskBritt

(57) ABSTRACT

Method for discriminating defects present on a frontside of a transparent substrate from defects present on a backside of the substrate comprises disposing the substrate in an inspection system in which first and a second light beams intersect at a measurement spot on the frontside of the substrate. Relative movement of the substrate and measurement spot is controlled such that a reference plane is kept tangential to the measurement path. A first pattern is identified in a measurement signal, the first pattern corresponding to light (Continued)

scattered by a particle on the backside of the substrate and presenting two intensity peaks separated from each other by a determined separation interval corresponding to the time necessary for the defect to be moved over the distance separating two illumination spots on the backside of the substrate.

20 Claims, 3 Drawing Sheets

(58) Field of Classification Search
    CPC ........... G01N 21/9501; G01N 21/9506; G01N 21/8851
    See application file for complete search history.

(56) References Cited

U.S. PATENT DOCUMENTS

| | | |
|---|---|---|
| 2018/0231370 A1 | 8/2018 | Durand De Gevigney et al. |
| 2020/0271718 A1 | 8/2020 | Gastaldo et al. |
| 2021/0215617 A1 | 7/2021 | Durand De Gevigney |

OTHER PUBLICATIONS

International Search Report for Application No. PCT/EP2022/082330 dated Feb. 24, 2023, 4 pages.
International Written Opinion for Application No. PCT/EP2022/082330 dated Feb. 24, 2023, 8 pages.
European Search Report and Search Opinion received for European Application No. 21315290.3, mailed on Jun. 17, 2022, 10 pages.

* cited by examiner

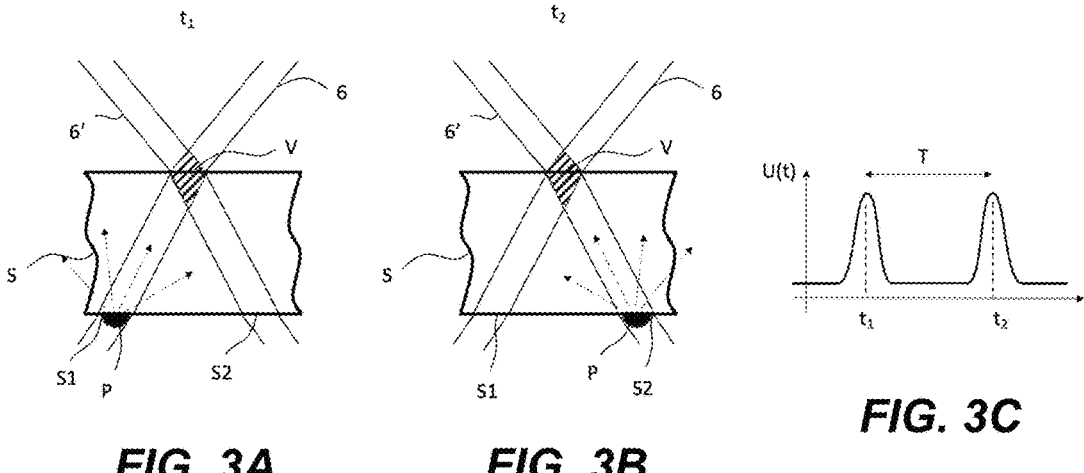
FIG. 3A
FIG. 3B
FIG. 3C
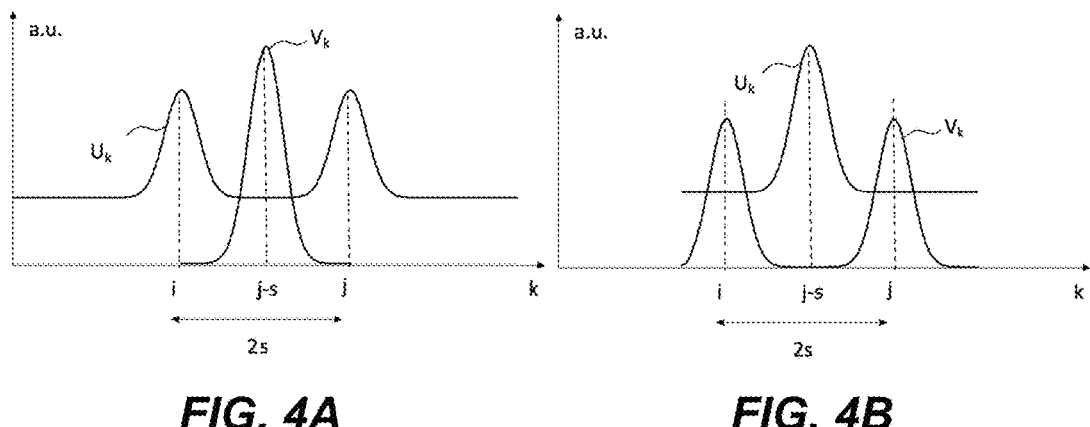
FIG. 4A
FIG. 4B
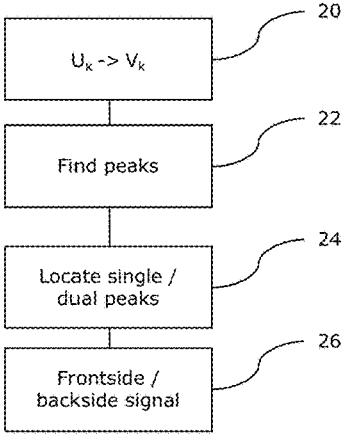
FIG. 5

METHOD AND SYSTEM FOR DISCRIMINATING DEFECTS PRESENT ON A FRONTSIDE FROM DEFECTS PRESENT ON A BACKSIDE OF A TRANSPARENT SUBSTRATE

CROSS-REFERENCE TO RELATED APPLICATIONS

This application is a national phase entry under 35 U.S.C. § 371 of International Patent Application PCT/EP2022/082330, filed Nov. 17, 2022, designating the United States of America and published as International Patent Publication WO 2023/117229 A1 on Jun. 29, 2023, which claims the benefit under Article 8 of the Patent Cooperation Treaty of European Patent Application Serial No. 21315290.3, filed Dec. 23, 2021.

TECHNICAL FIELD

The present disclosure relates to a system and to a method for the optical inspection of a substrate surface to detect the possible presence of defects such as particles, or more generally to characterize the surface condition of the substrate. The substrate can be a wafer for the manufacture of devices, for instance, in the field of microelectronics, optics, microsystems, or optoelectronics.

BACKGROUND

Substrates, such as wafers for electronics, optics or optoelectronics applications, need to be inspected to detect, identify and/or characterize possible defects present on their surface. Defects can be particles, crystal defects, scratches or surface roughness.

This inspection is generally intended to provide qualitative or quantitative information, such as, for example, the location, size and/or nature of the defects. This information about the surface condition of the substrate may be representative of the quality of the substrate manufacturing process or of a production step in which the substrate is used.

Documents WO2017167573, US2021215617A1, US20180231370 and WO0239099 disclose dark field systems for inspecting the frontside of such substrates, i.e., the surface of the substrate that is prepared to be processed in subsequent manufacturing steps. Those inspection systems are based on Laser Doppler Velocimetry (LDV) and comprises an optical source emitting a first light beam and a second light beam oriented in relation to one another so as to form, at their intersection, a measurement volume comprising a plurality of parallel interference fringes. The inspection system comprises a support to receive the substrate and to position it relative to the optical source such that the measurement volume intersects the frontside of the substrate and defines, on this frontside surface, a measurement spot. The support is rotated so that the measurement spot is scanned along concentric measurement paths on the frontside of the wafer. The scattered light is collected by collecting mirrors and directed to a detector for receiving the collected light and for providing an electrical signal representing the variation in intensity of the collected light as the measurement spot is scanned along the measurement path.

The presence of a defect on the frontside of the substrate results, when this defect crosses the measurement spot and presents a size smaller than the period of the interference fringes, in the scattering of a Doppler pulse measured by the detector. A Doppler pulse is a signal that has a double frequency component: a low-frequency component, forming the envelope of the signal, corresponding to the mean light intensity scattered by the defect, and a high-frequency component, corresponding to the Doppler frequency containing the information on the velocity of the defect through the measurement spot.

The presence of relatively larger defects, with size comparable to or larger than the period of the interference fringes results, when such a defect crosses the measurement spot, in the scattering of a pulse without high frequency components or with high frequency components of extremely reduced intensity.

In the case of a wafer made of transparent material (at the inspection wavelength of the two interfering beams), the two inspection beams also illuminate the backside of the substrate at two respective illumination spots. When a defect present on the backside crosses one of those illumination spots, the light scattered back toward the measurement spot is also collected by the mirrors and the detector produces a pulse similar to the one produced by a relatively large defect on the frontside of the wafer, although of lesser intensity.

In the inspection system according to the prior art, when used for inspecting wafers transparent at the inspection wavelength, the light scattered by the backside defects contaminates the light scattered by the frontside defects such that it is not possible to determine unambiguously the frontside condition of substrate.

The presence of high frequency components in a pulse may help associate this pulse to a defect on the frontside of the wafer, but a pulse deprived of a high frequency component can be either associated to a frontside defect or to a backside defect.

A purpose of the present disclosure is to resolve, at least partially, the aforementioned problem and to propose a system and method adapted to the inspection of a substrate made of a material transparent at the inspection wavelength. More specifically, the purpose of the present disclosure is to propose an inspection system and method for discriminating defects present on a frontside of a substrate from defects present on a backside of the substrate, the substrate being made of a material transparent at an inspection wavelength.

BRIEF SUMMARY

To this effect, the present disclosure relates to a method for discriminating defects present on a frontside of a substrate from defects present on a backside of the substrate, the substrate being made of a material transparent at an inspection wavelength, the method comprising:

disposing the substrate in an inspection system comprising at least one optical source coupled to an optical system for emitting a first light beam and a second light beam, the first and second light beams having the inspection wavelength and being contained and intersecting in a reference plane, the substrate being disposed on a support and being positioned with respect to the optical system such that the first and second light beams intersect at a measurement spot on the frontside of the substrate and also illuminate the backside of the substrate at two respective illumination spots separated by a distance;

controlling the relative movement of the support and the optical system to scan the measurement spot along a measurement path on the frontside of the substrate, the relative movement being controlled such that the reference plane is kept tangential to the measurement path;

collecting at least a portion of the light scattered by defects present on the frontside and/or on the backside of the substrate and establishing a signal representing the variation in intensity of the collected light as the measurement spot is scanned along the measurement path.

The method further comprises identifying in the signal a first pattern corresponding to the light scattered by a defect on the backside of the substrate and presenting two intensity peaks separated from each other by a determined separation interval corresponding to the time necessary for the defect to be moved over the distance separating the two illumination spots.

According to further non limiting features of the present disclosure, either taken alone or in any technically feasible combination:

the method further comprises filtering out the first pattern from the signal to prepare a frontside signal representative of defects only present on the frontside of the substrate;

the method further comprises preparing a backside signal representative of defects only present on the backside of the substrate;

identifying the first pattern comprises determining the separation interval using at least one of the following pieces of information: an intersecting angle of the first and second light beams in the substrate, a thickness of the substrate, a movement speed of the substrate relative to the light beams;

the identification of the first pattern comprises generating a reference signal or a mask signal using an information relative to the separation interval;

the method further comprises:

sampling the signal at a given sampling rate to prepare raw measurement samples;

establishing the separation interval as a determined number of samples, based on an intersecting angle of the first and second light beams, a thickness of the substrate, a relative movement speed and the sampling rate;

and wherein the identification of the first pattern in the signal comprises identifying two intensity peaks separated by the determined number of samples in at least some of the raw measurement samples;

the identification of the first pattern comprises:

a first step of applying a transformation function to at least some of the raw measurement samples to provide transformed samples, the transformation function being configured to map a first pattern in the raw measurement samples into a second pattern of greater intensity in the transformed samples;

a second step of detecting the second pattern in the transformed samples.

the second pattern comprises a peak providing the position of the first pattern in the raw measurement samples;

the detecting step further provides an average intensity of the first pattern two peaks and a background intensity;

the substrate is disk shaped and presents a symmetry axis and the relative movement of the support and of the optical system is a rotation around the symmetry axis of the substrate.

According to another aspect, the present disclosure relates to an inspection system for discriminating defects present on a frontside of a substrate from defects present on a backside of the substrate, the substrate being made of a material transparent at an inspection wavelength. The system comprises:

at least one optical source coupled to an optical system for emitting a first light beam and a second light beam, the first and second light beams having the inspection wavelength and being contained and intersecting in a reference plane;

a support to receive the substrate and to position the substrate relative to the optical system such that the first and the second light beams intersect at a measurement spot on the frontside of the substrate, the support and the optical source being movable relative to each other;

a controller for controlling the relative movement of the support and the optical system to scan the measurement spot along a measurement path on the frontside of the substrate, the controller being configured to control the relative movement such that the reference plane is kept tangential to the measurement path;

a collector for collecting at least a portion of the light scattered by defects present on the frontside and/or on the backside of the substrate;

a detector associated to the collector for receiving the collected light and for providing a signal representing the variation in intensity of the collected light as the measurement spot is scanned along the measurement path.

The inspection system also comprises a processing device connected to the detector, the processing device being configured to process the signal to identify a first pattern corresponding to the light scattered by a particle on the backside of the substrate and presenting two peaks separated from each other by a determined separation interval corresponding to the time necessary for the defect to be moved over the distance separating the two illumination spots.

According to further non limiting features of this aspect of the present disclosure, either taken alone or in any technically feasible combination:

the processing device is also configured:

to filter out the first pattern from the signal and prepare a frontside signal representative of defects only present on the frontside of the substrate, and/or;

to prepare a backside signal representative of defects only present on the backside of the substrate.

the processing device comprises a converter to sample the signal at a given sampling rate and prepare raw measurement samples;

the processing device comprises a FPGA and/or a processor to identify the first pattern at the given sampling rate.

BRIEF DESCRIPTION OF THE DRAWINGS

Many other features and advantages of the present disclosure will become apparent from reading the following detailed description, when considered in conjunction with the accompanying drawings, in which:

FIGS. 3A, 3B, and 3C illustrate the benefits of the inspection system when used to inspect a transparent substrate;

FIGS. 4A and 4B illustrate the application of a transform function on the signal provided by a detector of the inspection system;

FIG. 5 illustrates a process flow of an embodiment of the present disclosure;

DETAILED DESCRIPTION

Inspection System

Figure 1:
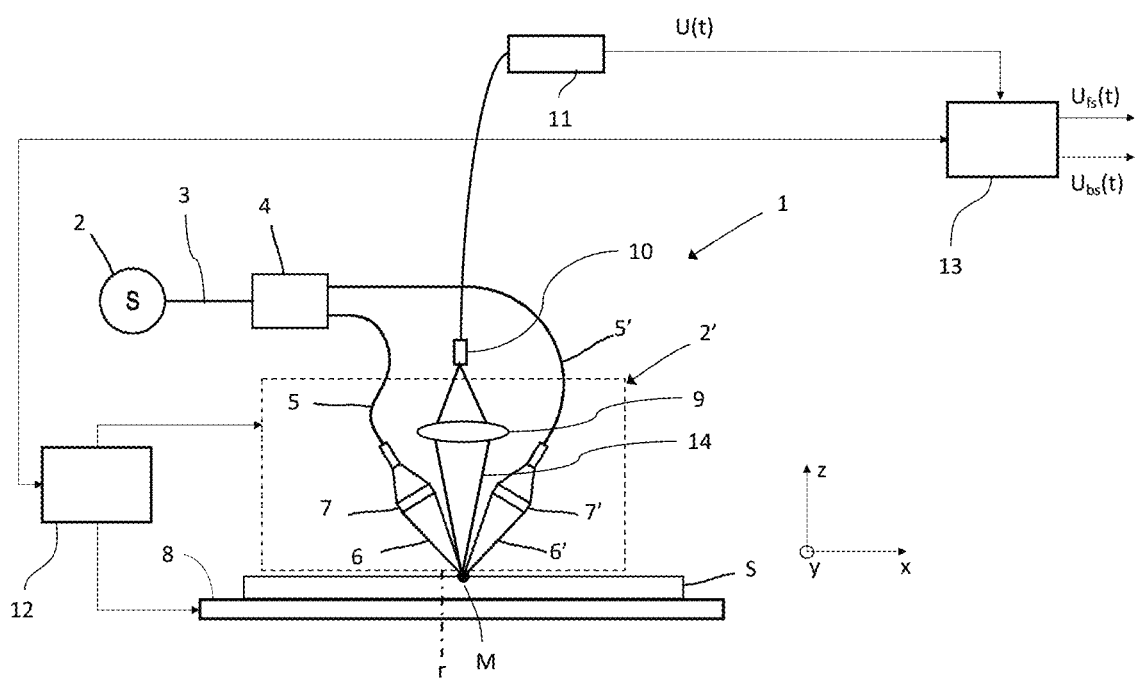
FIG. 1 represents an inspection system according to one embodiment.

FIG. 1 represents an inspection system 1 according to one embodiment. The inspection system 1 comprises at least one optical source 2, for instance, a laser source injecting a laser beam into an optical fiber. The optical source 2 produces a main light beam 3, preferably monochromatic, presenting a wavelength, referred to as the "inspection wavelength" in the rest of this disclosure, in the UV, visible or infrared range. The optical source 2 of this embodiment is coupled to an optical system 2' comprising a beam splitter 4 splitting the light into two fiber paths 5, 5', such that the main light beam 3 from the optical source 2 produces two light beams 6, 6'. The optical system may be an interferometric system. The beam splitter 4 and the fiber paths 5, 5' are configured such that the first and the second light beam 6, 6' are contained in a single plane, referred to as the "reference plane," or define, with their optical axis, such reference plane. Two converging optical elements 7, 7', such as collimating lenses, are respectively disposed in the propagation path of the first light beam 6 and the second light beam 6' such that the two light beams 6, 6' are oriented in relation to one another so as to form, at their intersection, a measurement volume. In a preferred embodiment, the two light beams 6, 6' are coherent and able to interfere with each other, so that the measurement volume comprises a plurality of parallel interference fringes.

Other configurations of the optical source 2 and of the optical system 2' than the one presented on the embodiment of FIG. 1 are naturally possible. Generally speaking, in an inspection system 1 according to the present disclosure, the at least one light source 2 and the optical system 2' are configured such that first and second light beams 6, 6', of preferably coherent light, are contained and are intersecting in a reference plane.

Continuing the description of the embodiment presented on FIG. 1, the inspection system 1 also comprises a support 8 to receive a substrate S. The support 8 is precisely positioned relative to the optical system 2' such that the first and the second light beams intersection, the measurement volume, intersects the substrate frontside, and defines a measurement spot M on this frontside.

The substrate S may be a wafer, i.e., a circular plate or disk of material presenting two opposing parallel surfaces respectively referred to as the backside and the frontside. By convention, the backside of the substrate corresponds to the surface put into contact with, or oriented toward, the support 8 of the inspection system 1. The wafer may be made of any material transparent at the inspection wavelength, such as glass or synthetic sapphire, that is, single crystal aluminum oxide for visible wavelengths, or semiconductor material such as silicon for inspection wavelengths in the infrared. But the present disclosure is not limited to a substrate in the form of a wafer, and its principle may be applied to any substrates, and, in particular, to any transparent substrate (at the inspection wavelength) of any shape and constitution as described below.

The support 8 and the optical system 2' are movable relative to each other and the inspection system 1 is designed so that the frontside of the substrate S passes through the measurement volume during its movement. As this is well known in the art, the support 8 and/or the optical system may be associated with actuators able to move one with respect to the other to achieve this relative movement.

The inspection system 1 comprises a controller 12 for controlling the relative movement of the support 8 and the optical system 2' to scan the measurement spot M along a desired measurement path on the frontside of the substrate S. The controller may comprise a microcontroller, data storage, input/output ports connected to the actuators and to other elements of the inspection system 1, and further computing resources that are configured, in hardware or in software, to precisely control the displacement of the measurement spot M on the desired measurement path. Advantageously, the controller 12 is also controlling the velocity of the measurement spot M along this path. The substrate S being precisely positioned on the support 8, the controller 12 stores and controls the position (in linear or polar coordinates) and velocity (linear velocity or rotational speed) of the measurement spot M in a referential linked to the substrate S.

The inspection system 1 also comprises a collector for collecting at least a portion of the light scattered by defects present on the frontside of the substrate S. In the embodiment of FIG. 1, the collector comprises a lens 9 collecting part of the diffuse light radiation. The lens 9 of this embodiment is centered about an axis passing through the measurement spot M and perpendicular to the substrate S. A portion of the scattered light 14 reflected from the substrate S is collected and directed to an optically conjugated point of the spot M by the lens 9. The collector also comprises complementary devices 10, such as an optical fiber or a bundle of optical fibers, arranged at or close to that conjugated point of the lens 9 to collect the scattered light 14. The inspection system 1 also comprises a detector 11, for instance, a photodetector or an array of photodetectors, associated to the collector for receiving the collected light. The detector 11 provides a signal U(t), for instance, an electrical signal, representing the variation in intensity of the collected light as the measurement spot M is scanned along the measurement path.

Finally, the inspection system 1 represented in FIG. 1 comprises a processing device 13 connected to the detector 11 to receive the signal U(t) as the measurement progresses. The processing device 13 is also connected to the controller 12, to receive from the controller the position Xx (t) of the measurement spot M as the measurement progresses, and possibly to also receive the velocity Vu (t) if this information is measured or determined by the controller 12. Velocity Vu (t) may also be derived from the position Xu (t) or may be a constant value, such that this information may not be provided by the controller 12 to the processing device 13. The processing devices may correspond to, or comprise, a microprocessor, a microcontroller, a FPGA or any other computing resources (input/output ports, data storage, . . . ) for processing the received information, and notably the signal U(t) to detect the presence of a particle on the backside and/or the frontside of the substrate, and discriminate from the two situations, as described in further detail below. This processing may be performed "on the fly," concurrently with the measurement or may be deferred until after the measurement has been achieved.

The processing device 13 (or the detector 11) may comprise a converter to sample the signal U(t) at a given sampling rate and prepare raw measurement samples $U_k$.

Figure 2:
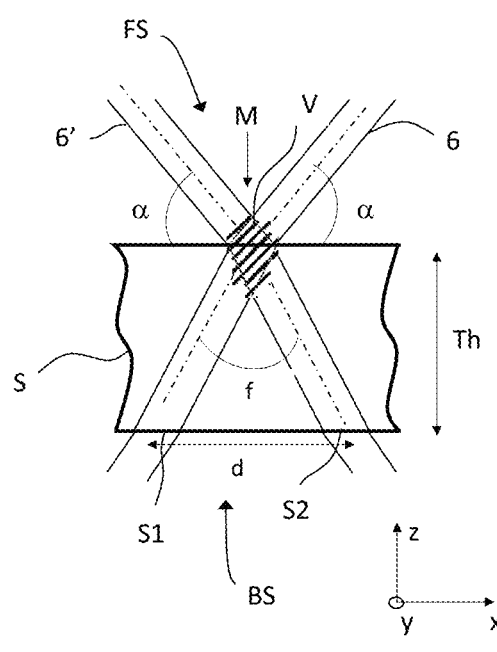
FIG. 2 illustrates the phenomenon taking place at the frontside and backside of a transparent substrate positioned on the support of the inspection system.

FIG. 2 illustrates the phenomenon taking place at the frontside FS and backside BS of a substrate S positioned on the support 8 of the inspection system 1, when this substrate S is made of a material transparent at the inspection wavelength. FIG. 2 is a cross-sectional view of the substrate S in the reference plane in which the first and second light beams 6, 6' are contained. As already mentioned, the first and second light beams 6, 6' interfere in a measurement volume V that intersects the frontside FS of the substrate S to form a measurement spot M on this frontside FS. The substrate S being made of a transparent material at the inspection wavelength of the light beams 6, 6', the beams 6, 6' propagate into the thickness Th of the substrate and also illuminate the backside BS of the substrate S at two respective illumination spots S1, S2. The two illumination spots S1, S2 are separated by a distance d that is dependent on the thickness of the substrate Th and on the angle f of the beams propagating into the substrate S. So, the two light beams 6, 6' are separated from each other on the backside BS, and illuminate that backside BS on two respective illumination spots S1, S2 distinct from each other. The angle f depends on the incidence angle, or the angle α between the first and second beams 6, 6' and the surface of the substrate, and on the refractive index of the substrate following the Snell-Descartes law. If the two light beams 6, 6' are relatively angled within the substrate S by the angle f, the distance d can be geometrically determined as d=2*Th*tan (f/2).

According to an important aspect, the controller 12 is configured to control the relative movement of the support 8 and of the optical system 2' such that the reference plane is kept tangential to the measurement path. This condition means that the velocity vector of the measurement spot M relative to the substrate, as this spot M is scanned along the measurement path, is contained in, or parallel to, the reference plane. The velocity vector extends therefore in the longitudinal direction x in FIGS. 1 and 2, with no component along the transverse direction y, being understood that the velocity vector should also be parallel to the surface of the substrate, or at least should not have a significant component along the vertical direction z to ensure that the measurement volume V intersects the frontside FS of the substrate S. Consequently, the velocity vector lying in, or being parallel to, the reference plane, the velocity Vu (t) of the measurement spot M corresponds to the velocity of this spot along the longitudinal direction x.

The relative movement operated by the controller 12, tangential to the measurement path may be rotational, or may be, for instance, a rotation of the support 8 (and of the substrate S) about a rotational axis r perpendicular to the plane of the support 8/substrate S, and disposed at the center of the substrate S. The measurement path described by the measurement spot M then forms a concentric circle on the frontside of the substrate S. Alternatively, the relative movement may be linear, along the longitudinal direction x, and the measurement path then forms a straight line on the frontside of the substrate S. The inspection system may be operated iteratively, after a relative displacement of the support 8 with respect to the optical system 2', to provide a plurality of measurements path along parallel, radial or concentric measurement paths, to provide a complete inspection of the frontside of the substrate S.

FIGS. 3A to 3C illustrate the benefits of the inspection system 1 when used to inspect a substrate S made of transparent material at the inspection wavelength. The substrate S presents a particle P on its backside. On FIG. 3A, at an instant t1 as the measurement spot M is scanned on the frontside of the substrate S, the particle P is disposed precisely at the first illumination spot S1 formed on the backside by the propagation of the first light beam 6. This light beam is scattered by the particle P, and part of the scattered light diffuses toward the measurement spot M. This part of the scattered light is collected and detected by the inspection system, as if it were produced at the measurement spot M itself. The signal U(t) prepared by the detector 11 presents therefore a first peak of intensity at the first instant t1, as is represented in FIG. 3C.

FIG. 3B represents the substrate S at an instant t2, shortly after the instant t1 represented on FIG. 3A. At this instant t2, the particle P is disposed precisely at the second illumination spot S2 formed on the backside by the propagation of the second light beam 6'. This light beam is scattered by the particle P, and part of the scattered light diffuses toward the measurement spot M. This part of the scattered light is collected and detected by the inspection system, as if it were produced at the measurement spot M itself. The signal U(t) prepared by the detector 11 presents therefore a second peak of intensity at the second instant t2, as is represented on FIG. 3C.

The relative movement being controlled such that the reference plane is tangential to measurement path, a particle P presents on the backside that crosses one of the illumination spots S1, S2, necessarily also crosses the other illumination spot S2, S1. Consequently, the light scattered by a particle P on the backside of the substrate produces in the signal U(t) a first pattern presenting two intensity peaks U(t1), U(t2) separated from each other by a separation interval. This interval may be associated to a determined time period T=(t2−t1) that corresponds to the time necessary for the particle P to be moved over the distance d separating the two illumination spots S1, S2, and can be obtained by dividing this distance d by the velocity of the measurement spot $V_M$, i.e., T=d/$V_M$.

When the signal provided by the detector 11 is expressed as a function of the position of the measurement spot on the substrate or on the measurement path, the separation interval corresponds to the distance d.

Method for Discriminating Defects

The present disclosure takes advantage of this observation, which results from the configuration of the inspection system just described, to propose a method for discriminating defects present on a frontside of a substrate S from defects present on a backside of the substrate S, when the substrate S is made of a material transparent at an inspection wavelength.

The method comprises disposing the substrate S on the support 8 of the inspection system 1, the substrate S positioned with respect to the optical system 2' such that the first light beam 6 and the second light beam 6' intersect at the frontside of the substrate S. The method then comprises moving the support and the optical system 2' relative to each other to scan the measurement spot M along a desired measurement path on the frontside of the substrate S, the relative movement being controlled by the controller 12 such that the reference plane is kept tangential to the measurement path. As the measurement spot M is scanned along the frontside of the substrate, at least a portion of the light scattered by the substrate S surfaces, and notably by defects present on the frontside and/or on the backside of the substrate S, is collected by the detector 11 and establishes the signal U(t) representing the variation in intensity of the collected light.

According to the present disclosure, the method further comprises identifying in the signal U(t) a first pattern presenting two intensity peaks separated from each other by a determined separation interval. As this has been explained in relation to the description of FIGS. 3A to 3C, the first pattern corresponds to the light scattered by a particle on the backside of the substrate S. Therefore, if such a first pattern is present in the signal U(t), it can be established unambiguously that a particle P is present on the backside of the substrate. The position of the particle P (its coordinate in a plane parallel to the backside of the substrate) corresponds to the position of the measurement spot M at the average time (t1+t2)/2, i.e., at half the separation distance between the two peaks.

Conversely, intensity peaks in the signal U(t) that do not conform to the first pattern correspond to particles present on the frontside of the substrate FS.

As it is possible to discriminate defects present on the frontside of the substrate from defects present on the backside of the substrate, the inspection system 1 may be configured to prepare a frontside signal $U_{fs}(t)$ representative of defects only present on the frontside of the substrate, for instance, by filtering out the first pattern from the electrical signal U(t). In addition or alternatively, the inspection system 1 may be configured to prepare a backside signal $U_{bs}(t)$ representative of defects only present on the backside of the substrate S.

The identification of the first pattern in the signal may require calibrating this pattern to the substrate under inspection, in particular, to determine the separation interval that separates the two intensity peaks. As previously shown, this separation distance may be calculated in advance, if the scanning velocity is kept constant or is known, from the knowledge of the thickness of the substrate and from the angular configuration of the first and second light beams. More generally, the separation interval may be determined using at least one of the following pieces of information: an incidence angle of the first and second light beams on the substrate, a refractive index of the substrate, an intersecting angle of the first and second light beams in the substrate, a thickness of the substrate, a velocity of the substrate relative to the light beams.

The calibrated first pattern may be stored in the inspection system 1, for instance, in the processing device 13.

Alternatively, a collection of first patterns, or some characteristics of first patterns such as distance or time interval, each corresponding to a type of substrate, may be stored in the inspection device and retrieved according to the nature of the substrate under test, before the inspection starts.

If the velocity of the measurement spot is not kept constant during the measurement path, the separation interval of the first pattern may be calculated or adjusted to the actual velocity at each given instant, and the first pattern dynamically calibrated.

When the signal is sampled by a converter of the processing device 13 to establish raw measurement samples $U_k$, the separation interval may be expressed as a determined number of samples 2s, and the identification of the first pattern in the signal comprises identifying two intensity peaks separated by the determined number of samples 2s in consecutive raw measurement samples.

This identification of the first pattern may be performed by the processing device 13 according to many different ways. For instance, the processing device may implement any kind of pattern recognition algorithm. It may, for instance, implement a correlation method, correlating the signal with a template pattern signal. It may also implement a pattern recognition algorithm trained by machine learning, that sets an indicator signal if the first pattern is recognized in the signal as the measurement progresses.

Alternatively, the intensity peaks may be established in the raw measurement samples $U_k$ (for instance, by numerical derivation) and a first pattern may be identified in the raw measurement samples $U_k$ if the indexes i, j of the sample Ui, Uj corresponding to two successive peaks differ by the predetermined number of sample, i.e., j−i=2 s. This operation may be performed "on the fly," as the raw measurement samples are established by the processing device 13. The raw information samples may be stored in a data storage comprised in (or associated with) the processing device 13, and the identification of the first pattern may be deferred until after the inspection is completed in such a case.

Whether the identification is done "on the fly" or in a deferred manner, it advantageously also provides the position of the first pattern in the raw measurement samples, i.e., the index i+s or j−s. By combining this index information with the position $X_M$ of the measurement spot M (received from the controller 12) as the measurement progresses, it is possible to precisely locate the particle P at the origin of the identified first pattern on the backside of the wafer. The particle locations may be stored as the inspection progresses and displayed as a substrate map or treated otherwise at the end of the inspection sequence.

Identification by Applying a Transformation Function

The intensity peaks of the electrical signal that corresponds to backside particles P may be of relatively low amplitude. This is because only a part of the light scattered by such particles P is directed to the measurement spot M, collected and detected.

So advantageously, the identification of the first pattern comprises a first step of applying a transformation function to the signal U provided by the detector 11. The transformation function is selected to map this signal U into a transformed signal V, a first pattern present in the original signal U being transformed into a second pattern of greater intensity or, more generally, of greater detectability in the transformed space. The identification then comprises a second step of detecting the second pattern in the transformed signal V.

To illustrate this principle, and according to a particular embodiment, the transformation may be implemented (when processing digital raw measurement samples) by the following function:

$$V_i = U_{i+s} + U_{i-s} - U_{i+3s} - U_{i-3s};$$
$$i = 3s + 1, \ldots, N - 3s$$

For ease of implementation by the processing device 13, the function may also be expressed as:

$$V_i = \sum_{k=-3s}^{3s} w_k U_{i+k}$$

With $w_k$ representing a mask consisting of 6 s+1 elements, of which only 4 are non-zero, while remaining 6 s−3 entries are zeros:

| $w_{-3s}$ | $w_{-3s+1}$ | $\cdots$ | $w_{-s-1}$ | $w_{-s}$ | $w_{-s+1}$ | $\cdots$ | $w_{s-1}$ | $w_s$ | $w_{s+1}$ | $\cdots$ | $w_{3s-1}$ | $w_{+3s}$ |
|---|---|---|---|---|---|---|---|---|---|---|---|---|
| −1 | 0 | 0 | 0 | 1 | 0 | 0 | 0 | 1 | 0 | 0 | 0 | −1 |

The behavior of the transformed samples $V_k$ when the original sample $U_k$ comprises a first pattern corresponding to a backside particle is shown in FIG. 4A. It contains a second pattern presenting a single peak at the midpoint between the two peaks of the first pattern, the sole peak of the second pattern being positioned precisely at the backside defect location. The amplitude A of this peak is double the amplitude A/2 of the first pattern peaks in the raw measurement samples $U_k$. The transformed samples also contain negative values, which are not shown in the figure, that are irrelevant, and simply set to zero:

$$V_i < 0 \mapsto V_i = 0$$

The transformed samples $V_k$ feature a very different behavior for a single peak in the signal generated by a frontside particle, as is shown in FIG. 4B. In this case, the transformed samples present two peaks separated by an interval of length $2s$. Specifically, if a front side particle generates a peak centered at an instant k, the corresponding profile of the transformed samples $V_k$ has two peaks at $V_k+s$ and $V_k-s$. The amplitude of the two peaks on the transformed signal is the same as the amplitude of the peak in the original signal.

It is to be noted that the signal illustrated in FIG. 4B is for a particle that is large enough to average out the high-frequency signal, which would result otherwise with a smaller particle crossing the interference fringes of two interfering beams. Or alternatively, this signal could result from any particle crossing two beams incoherently with each other, thus not interfering.

To summarize, the transformed signal V or samples $V_k$ according to this embodiment possess the following properties:

it is zero in areas of constant intensity;
it is independent on the background signal level, i.e., the average signal value in the absence of particle (often referred to as "haze" in the technical field);
it has one pulse at the location of a backside particle;
it has two separate pulses around a frontside particle.

Transform functions having such properties make the transformed signal or samples $V_k$ very useful for detecting backside particle locations as well as for distinguishing between back- and frontside particles. This transformed signal can be used alone. It can also be used in combination with the raw measurement signal $U_k$, to better discriminate between back- and frontside particles, by detecting, for instance, single peaks in the raw measurement signal matched with dual peaks in the transformed signal and corresponding to front particles, and dual peaks in the raw measurement signal matched with single peaks in the transformed signal and corresponding to front side particles.

Referring to FIG. 5, according to this preferred embodiment wherein the identification of the first pattern comprises the application of a transform function, the identification may comprise the following steps executed by the processing device.

First, in step 20, the transformed samples $V_k$ are calculated for all original samples $U_k$, either on the fly or in a deferred manner as mentioned above. Those samples may suffer from noise and, to optionally eliminate that noise, only transformed samples $V_k$ that exceed a first specified threshold are retained for further analysis. Then, in step 22, the maxima are located within the transformed samples. This can be performed, for instance, by derivation or by selecting samples that exceed a second specified threshold. In step 24, all maxima that have the similar amplitudes and are separated by an interval 2 s are ignored because they correspond to front side particles. This detection can be enhanced by verifying that the pair of maxima correspond to a peak in the raw measurement signal. The remaining transformed samples $V_k$ contain only single peaks, each attributed to a backside particle, such that the position of these particles may be obtained.

In step 26, using the position of the backside particle, it is possible to process the original signal or sample to either prepare a frontside signal representative of defects only present on the frontside of the substrate and/or prepare a backside signal representative of defects only present on the backside of the substrate.

Removal of the Contribution of Backside Particles in the Signal Provided by the Detector.

According to one embodiment, the position of the backside particle may be used to process the original signal or sample to prepare a frontside signal representative of defects only present on the frontside of the substrate. This is the object of this section of the description, being understood that a similar method may be used to prepare a backside signal representative of defects only present on the backside of the substrate.

As preliminary remark, the signal provided by the detector 11 (or the raw measurement samples $U_k$) is a sum of a background part b and of the particle scattered part. As stated above, the amplitude of the second pattern peak (A) is double the amplitude of corresponding peaks in the first pattern (A/2). The intensity profile in the laser beams is well approximated by a Gaussian profile with known standard deviation $\sigma$, expressed in number of samples hereafter. For this reason, the double peak signal generated for sample number i by a backside particle situated at a position with sample number m is modelled as $$u_{BS}(i) = b + (A/2)\exp\left(-\frac{(i-m+s)^2}{2\sigma^2}\right) + (A/2)\exp\left(-\frac{(i-m-s)^2}{2\sigma^2}\right),$$

where s is a half of the separation interval expressed in number of samples.

According to this embodiment, the background level of the original signal or raw measurement samples is determined. The method comprises determining the amplitude A of the peak in a second pattern identified in the transform samples, and subtracting half of this amplitude A/2 from a peak amplitude in the raw measurement samples to establish the background level b. This actually provides two background level estimates, one for each of the two peaks. The estimated background level may be selected to correspond to the mean value:

$$b = \frac{1}{2}(u(m-s) + u(m+s) - A)$$

where m is the sample number corresponding to the detected position of a backside particle.

Then, a reference signal U'(i) of the light scattered by a backside particle is prepared based on the model $U_{BS}$ above and on the determined amplitude level A/2, position of the particle m and background level b.

The final step is to subtract the reference signal from the signal provided by the detector. This operation removes backside particle signatures leaving front side particle contribution untouched in the signal.

Figure 6A:
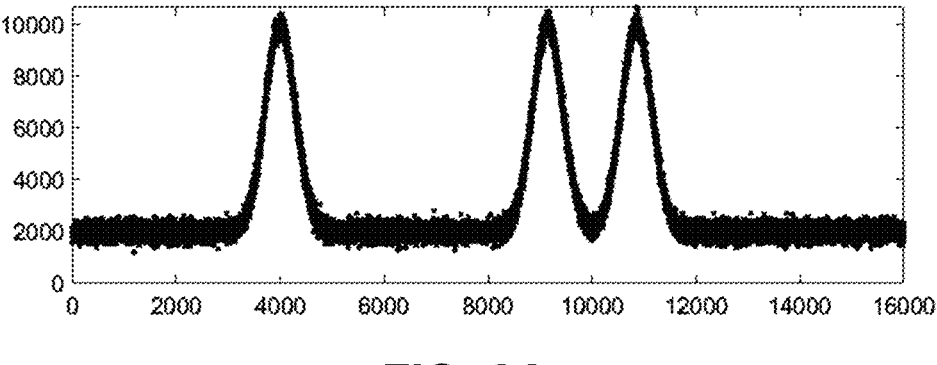
FIGS. 6A and 6B illustrate the preparation of a signal filtered out from the backside particle signature.
Figure 6B:
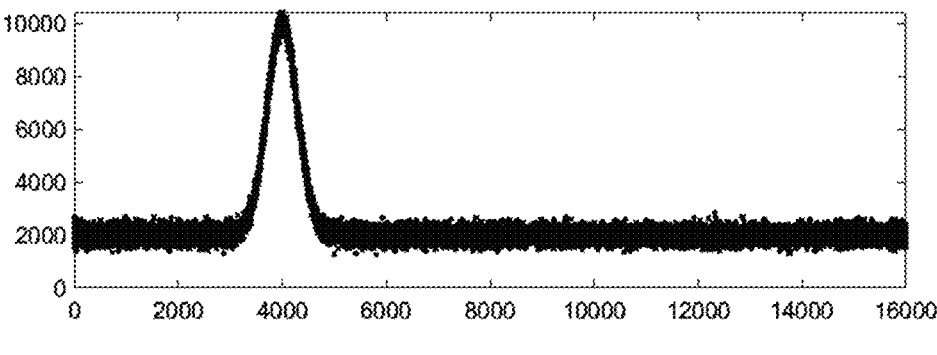

FIGS. 6A and 6B illustrate this embodiment. FIG. 6A shows the noisy signal from the detector with one single peak (front side particle) and one double peaks (backside particle).

FIG. 6B demonstrates the signal filtered from backside particle signatures, while the contribution from frontside particle is kept unchanged.

Alternatively, once a double peak corresponding to a back side particle is identified, a model function such as the one described above can be fitted to the raw measurement signal using any curve-fitting or least square method, and subtracted from this signal to retain only the background noise.

Other variations to the disclosed embodiments can be understood and effected by those skilled in the art in practicing the claimed invention, from a study of the drawings, the disclosure, and the appended claims.

The invention claimed is:

1. An inspection system for discriminating defects present on a frontside of a substrate from defects present on a backside of the substrate, the substrate being made of a material transparent at an inspection wavelength, the system comprising:

at least one optical source coupled to an optical system for emitting a first light beam and a second light beam, the first and second light beams having the inspection wavelength and being contained and intersecting in a reference plane;

a support to receive the substrate and to position the substrate relative to the optical system such that the first and second light beams intersect at a measurement spot on the frontside of the substrate and also illuminate the backside of the substrate at two respective illumination spots separated by a distance, the support and the optical system being movable relative to each other;

a controller for controlling the relative movement of the support and the optical system to scan the measurement spot along a measurement path on the frontside of the substrate, the controller being configured to control the relative movement such that the reference plane is kept tangential to the measurement path;

a collector for collecting at least a portion of the light scattered by defects present on the frontside and/or on the backside of the substrate;

a detector associated to the collector for receiving the collected light and for providing a signal representing a variation in intensity of the collected light as the measurement spot is scanned along the measurement path; and a processing device connected to the detector, the processing device being configured to process the signal to identify a first pattern corresponding to the light scattered by a defect on the backside of the substrate, the first pattern presenting two peaks separated from each other by a determined separation interval corresponding to a time necessary for the defect to be moved over the distance separating the two illumination spots.

2. The inspection system of claim 1 wherein the processing device is also configured:

to filter out the first pattern from the signal and prepare a frontside signal representative of defects only present on the frontside of the substrate; and/or to prepare a backside signal representative of defects only present on the backside of the substrate.

3. The inspection system of claim 2, wherein the processing device comprises a converter configured to sample the signal at a given sampling rate and prepare raw measurement samples.

4. The inspection system of claim 3, wherein the processing device comprises a FPGA and/or a processor configured to identify the first pattern at the given sampling rate.

5. The inspection system of claim 1, wherein the processing device comprises a converter configured to sample the signal at a given sampling rate and prepare raw measurement samples.

6. The inspection system of claim 5, wherein the processing device comprises a FPGA and/or a processor configured to identify the first pattern at the given sampling rate.

7. A method for discriminating defects present on a frontside of a substrate from defects present on a backside of the substrate, the substrate being made of a material transparent at an inspection wavelength, the method comprising:

disposing the substrate in an inspection system comprising at least one optical source coupled to an optical system for emitting a first light beam and a second light beam, the first and the second light beams having the inspection wavelength and being contained and intersecting in a reference plane, the substrate being disposed on a support and being positioned with respect to the optical system such that the first and the second light beams intersect at a measurement spot on the frontside of the substrate and also illuminate the backside of the substrate at two respective illumination spots separated by a distance;

controlling relative movement of the support and the optical system to scan the measurement spot along a measurement path on the frontside of the substrate, the relative movement being controlled such that the reference plane is kept tangential to the measurement path;

collecting at least a portion of the light scattered by defects present on the frontside and/or on the backside of the substrate and establishing a signal representing a variation in intensity of the collected light as the measurement spot is scanned along the measurement path; and identifying a first pattern in the signal, the first pattern corresponding to light scattered by a defect on the backside of the substrate and presenting two intensity peaks separated from each other by a determined separation interval corresponding to a time necessary for the defect to be moved over the distance separating the two illumination spots.

8. The method of claim 1, further comprising filtering out the first pattern from the signal to prepare a frontside signal representative of defects only present on the frontside of the substrate.

9. The method of claim 1, further comprising preparing a backside signal representative of defects only present on the backside of the substrate.

10. The method of claim 1, wherein the identifying the first pattern comprises determining the separation interval using at least one of the following pieces of information: an intersecting angle of the first and second light beams in the substrate, a thickness of the substrate, a movement speed of the substrate relative to the light beams.

11. The method of claim 1, wherein the identifying the first pattern comprises generating a reference signal or a mask signal using information relative to the separation interval.

12. The method of claim 1, further comprising:

sampling the signal at a given sampling rate to prepare raw measurement samples;

establishing the separation interval as a determined number of samples, based on an intersecting angle of the first and second light beams, a thickness of the substrate, and a relative movement speed and the sampling rate;

and wherein the identifying the first pattern comprises identifying two intensity peaks separated by the determined number of samples in at least some of the raw measurement samples.

13. The method of claim 12, wherein the identifying the first pattern comprises:

a first step of applying a transformation function to at least some of the raw measurement samples to provide transformed samples, the transformation function being configured to map a first pattern in the raw measurement samples into a second pattern of greater intensity in the transformed samples; and a second step of detecting the second pattern in the transformed samples.

14. The method of claim 13, wherein the second pattern comprises a peak providing a position of the first pattern in the raw measurement samples.

15. The method of claim 13, wherein the second step further comprises determining an average intensity of the first pattern two peaks and a background intensity.

16. The method of claim 1, wherein the substrate is disk shaped and presents a symmetry axis, and the relative movement of the support and the optical system is a rotation around the symmetry axis of the substrate.

17. The method of claim 8, further comprising preparing a backside signal representative of defects only present on the backside of the substrate.

18. The method of claim 17, wherein the identifying the first pattern comprises determining the separation interval using at least one of the following pieces of information: an intersecting angle of the first and second light beams in the substrate, a thickness of the substrate, a movement speed of the substrate relative to the light beams.

19. The method of claim 18, wherein the identifying the first pattern comprises generating a reference signal or a mask signal using information relative to the separation interval.

20. The method of claim 19, further comprising:

sampling the signal at a given sampling rate to prepare raw measurement samples;

establishing the separation interval as a determined number of samples, based on an intersecting angle of the first and second light beams, a thickness of the substrate, and a relative movement speed and the sampling rate;

and wherein the identifying the first pattern comprises identifying two intensity peaks separated by the determined number of samples in at least some of the raw measurement samples.

* * * * *